United States Patent
Williams

(10) Patent No.: US 9,180,626 B2
(45) Date of Patent: Nov. 10, 2015

(54) FIBRE-WOUND STRUCTURES WITH REINFORCEMENT RIBS

(71) Applicant: Camplas Technology Limited, Bridgend (GB)

(72) Inventor: Anthony Carey Williams, Bridgend (GB)

(73) Assignee: Camplas Technology Limited, Bridgend (GB)

(*) Notice: Subject to any disclaimer, the term of this patent is extended or adjusted under 35 U.S.C. 154(b) by 0 days.

(21) Appl. No.: 14/315,565

(22) Filed: Jun. 26, 2014

(65) Prior Publication Data
US 2015/0007928 A1    Jan. 8, 2015

(30) Foreign Application Priority Data
Jun. 26, 2013    (GB) .................................. 1311354.3

(51) Int. Cl.
| | | |
|---|---|---|
| B29C 53/60 | (2006.01) | |
| B29C 70/86 | (2006.01) | |
| B29C 70/30 | (2006.01) | |
| B29C 70/32 | (2006.01) | |
| B29C 53/58 | (2006.01) | |
| B29C 53/80 | (2006.01) | |
| F17C 1/08 | (2006.01) | |
| B29K 101/12 | (2006.01) | |
| B29K 105/10 | (2006.01) | |

(52) U.S. Cl.
CPC ............... B29C 70/30 (2013.01); B29C 53/585 (2013.01); B29C 70/32 (2013.01); B29C 53/582 (2013.01); *B29C 2053/8025* (2013.01); *B29K 2101/12* (2013.01); *B29K 2105/10* (2013.01); *F17C 1/08* (2013.01)

(58) Field of Classification Search
CPC .............. B29C 53/582; B29C 53/8016; B29C 2053/8025; F17C 1/08
USPC ........... 156/169, 172, 173, 175; 138/174, 176
See application file for complete search history.

(56) References Cited

U.S. PATENT DOCUMENTS
2,943,967 A    7/1960   Simon

FOREIGN PATENT DOCUMENTS
| EP | 0538832 A1 | 4/1993 |
|---|---|---|
| GB | 2256420 | * 9/1992 |
| GB | 2256420 A | 9/1992 |

OTHER PUBLICATIONS

Wang, Ru-Min, et al. Polymer Matrix Composites and Technology. pp. 291-296. © 2011 Woodhead Publishing.*
UKIPO, Search Report, Dec. 11, 2014.

* cited by examiner

*Primary Examiner* — Carson Gross
(74) *Attorney, Agent, or Firm* — Quarles & Brady LLP

(57) ABSTRACT

A method of forming an external rib on a helically wound article is disclosed. The method includes the steps of, in any suitable order, forming bunched strands or tows of continuous fiber, each bunch being held taught in-line with the major axis of the intended rib and successively winding each bunch or tow between successive sequentially helically wound fibers around an article former whereby the bunched strands or tows are each separated by helically wound strands of fiber, to thereby form on completion a wound article having integrally formed external support ribs of generally pyramidal section. A similar method is provided for forming an internal rib in a helically wound article.

1 Claim, 2 Drawing Sheets

FIBRE-WOUND STRUCTURES WITH REINFORCEMENT RIBS

CROSS-REFERENCE TO RELATED APPLICATIONS

Figure 1:
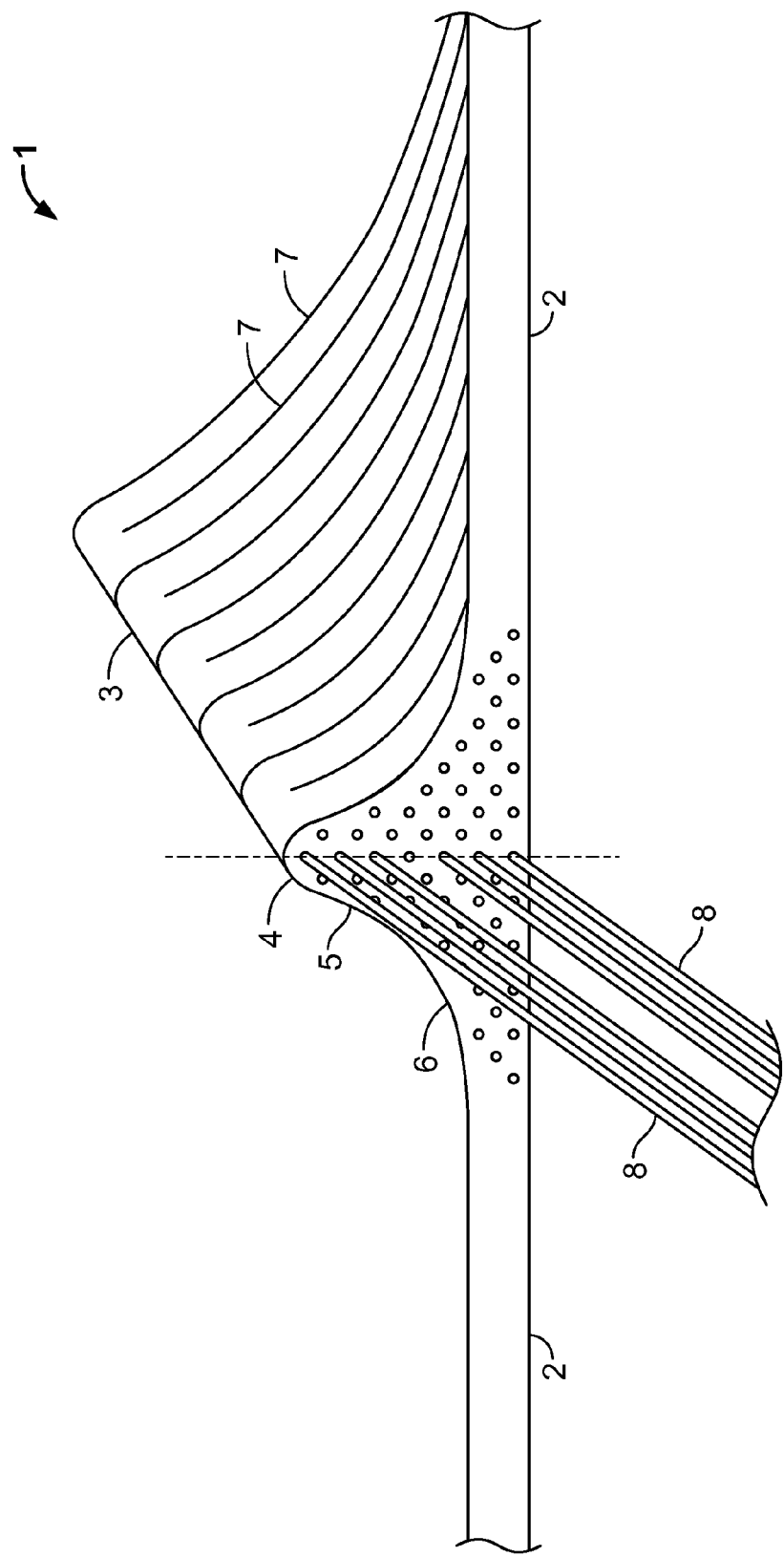

This application claims priority to UK Patent Application No. 1311354.3 filed Jun. 26, 2013, the entirety of which is hereby incorporated by reference herein for all purposes.

FIELD OF THE INVENTION

This invention related to the manufacture of articles or structures made by winding continuous strands of e.g. glass fibre or carbon fibre around a former, usually in a helical fashion, whereafter or during which, the fibres are coated with a settable resin, such as polyester or an epoxy resin, which hardens to produce the required shape of article.

BACKGROUND OF THE INVENTION

Reinforcement ribs for wound articles are often important as a means of preventing inward or outward collapse of the side walls of the articles due to mechanical pressure thereon and in our GB2256420 we disclosed a method of forming the reinforcement ribs integrally with the remainder of the structure by sequentially interposing between the helical windings straight windings along the length of the intended rib with the object being to form a rib of substantially triangular shape, ideally having a height about two or three times the intended base of the triangle so as to produce the required stiffness. However, in practice it has been found that winding individual straight fibres in this way within the helically wound fibres makes them tend to spread out to form a flattish band rather than a required rib of height sufficient to provide the required stiffness.

SUMMARY OF THE INVENTION

The present invention is derived from the realisation that there is a need to improve the process by which such ribs are formed so that they are sufficiently raised relative to the wall of the article being formed to provide a rib of the required stiffness.

According to a first aspect of the invention, there is provided a method of forming an external rib on a helically wound article, the method including the steps of, in any suitable order, forming bunched strands or tows of continuous fibre, each bunch being held taut in-line with the major axis of the intended rib and successively winding each bunch or tow between successive sequentially helically wound fibres around the article whereby the bunched strands or tows are each separated by helically wound strands of fibre, to thereby form on completion a wound article having integrally formed external support ribs of generally pyramidal section.

According to a second aspect of the invention there is provided a method of making an internal rib in a helically wound article including the steps of, in any suitable order, providing a generally inverted pyramidal-shaped elongated rib former for receiving, in use, bunched strands or tows of continuous fibre, each bunch being held taut in-line with the major axis of the intended rib within the rib former, and sequentially helically winding fibres around the article former and into the rib former, whereby the bunched strands are each separated by helically wound strands of fibre, to thereby form on completion a wound article having integrally formed internal support ribs of shape corresponding to the rib former.

With either method the resulting ribs are more pronounced than those made possible by the method of GB2256420 because in each case the bunched strands or tows are forced to remain in-line with the major-axis of the rib rather than being allowed to spread outwardly, and in each case the resulting ribs comprise a generally pyramid shaped section having a rounded top or bottom and steeply curved sides.

DETAILED DESCRIPTION OF THE DRAWINGS

Figure 2:
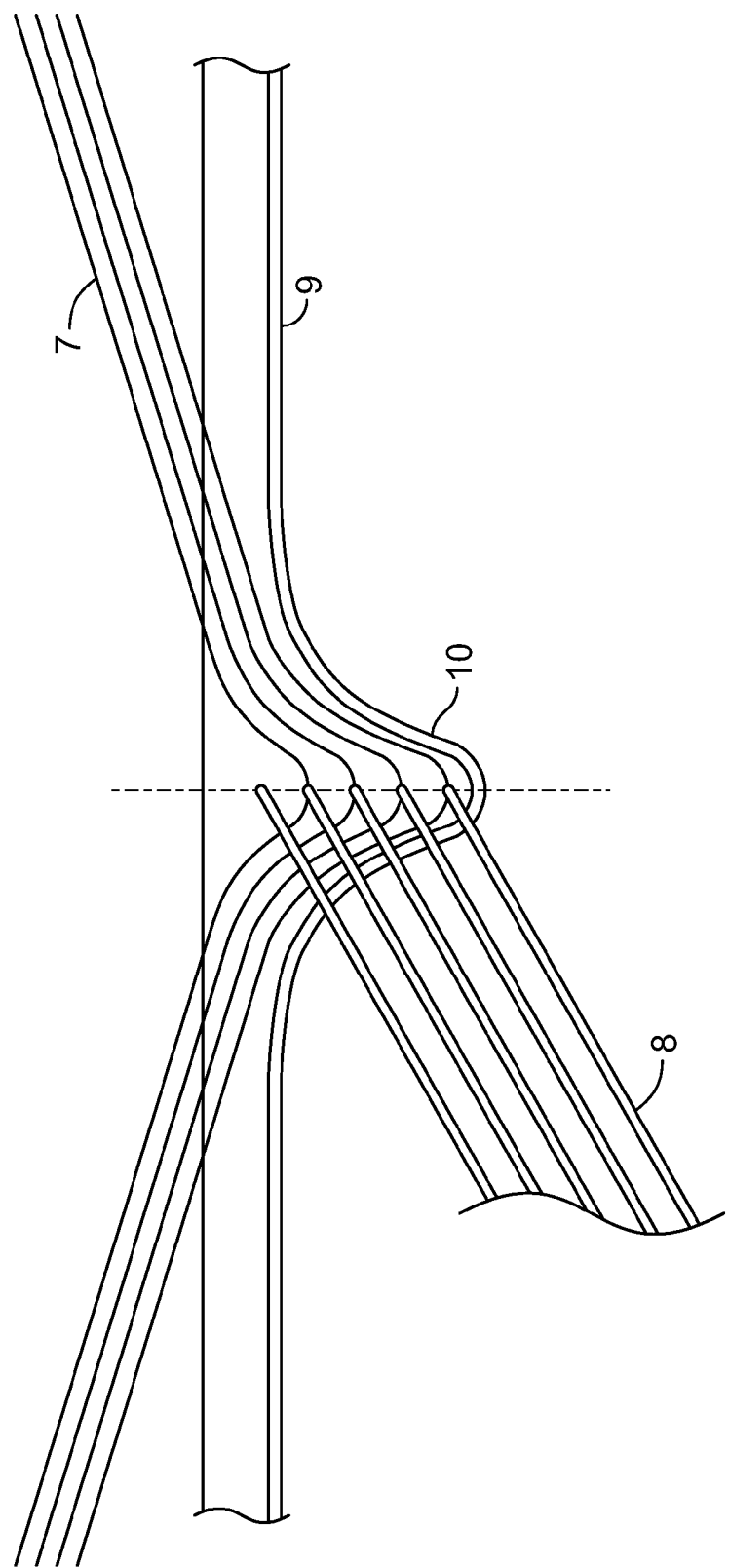

The invention will now be described, by way of example only, with reference to the accompanying drawings in which:

FIG. 1 is a part-sectional view of part of a wound article with an externally formed reinforcement rib, and FIG. 2 is a part-sectional view of the process for forming an internal rib using a generally inverted pyramidal-shaped rib-forming mould.

DESCRIPTION OF THE INVENTION

FIG. 1 shows a section through part of a continuously wound article shown generally at 1, which may typically be in the form of a tube or cylindrical container having a wall surface 2 and a series of raised ribs 3 (only one of which is shown) in the general form of a rounded pyramid with a rounded top portion 4, steep sides 5 and a gently sloped based 6 where the rib 3 joins the wall portion 2 of the article 1. The rib 3 is formed from helically-wound continuous strands or fibres 7 interleaved by bunched strands or tows 8 which are held taut in-line with the major axis of the rib 3 during manufacture of the article 1 such that, as illustrated, individual bunched strands or tows 8 are formed sequentially each above the other and are each interleaved with continuous windings of strands 7. The major axis of the rib may be directed around the wall surface 2 in a plane substantially perpendicular to a longitudinal axis of the article 1, or may alternatively be wound in a helical manner around the article 1. The use of bunched strands or tows 8 provides sufficient strength for them to be held taut during manufacture of the article 1 to ensure that the continuously wound strands 7 do not tend to flatten out the desired shape of the rib 3 during manufacture, in contrast to the prior art method described in GB2256420 where individual strands of continuous fibre are interweaved with the helically wound fibres, which result in a less pronounced rib because there is nothing to stop the helically wound fibres from tending to flatten the rib as they are being wound about the article being made.

FIG. 2 shows how an internal rib can be made in accordance with the second aspect of the invention where a preformed mould 9 includes an inverted pyramidal-shaped elongated rib former 10 representing the desired shape of a rib, into which the bunched strands 8 of FIG. 1 can instead be introduced sequentially between layers of helically wound continuous fibres 7 to eventually build up to form a completed article (not shown). During manufacture of the article, the bunched strands 5 are again held taught taut and effectively force the helically wound fibres 7 into the rib-shaped section 10 of the mould 9. In practice, it has been found that this is best achieved by initially winding the continuous strands or fibres 7 at a relatively steep angle, such as 80° to the major axis of the intended rib, whereafter the winding angle may be reduced, such as to 60°, although other angles may be appropriate depending upon the shape of the article being formed.

As may be apparent with regard to the method of forming an internal rib of the shape shown in FIG. 2, it is found in practice to be difficult and time consuming to extract the mould or rib former 10 and hence the invention also envisages the use of an elastomeric deformable mould or rib former which may be peeled away from the inwardly pointing rib after it has been formed and has set. An alternative method to avoid the difficulties in extracting the mould or rib former would be to leave it in place such that it becomes part of the finished, reinforced, article or structure being made by this method and, for example, the mould or rib former could be in the form of a thin plastic or GRP moulding, or rigid foam moulding with recesses set therein to accept the ribs as they are wound with the bunched strands 8.

The invention in both its aspect therefore provides a method of forming ribs which are generally more pronounced than those made possible under the teaching of GB2256420 by utilising the concept of supporting the continuous strands or fibres 7 through the use of bunched strands or tows 8 held in tension during the rib-forming process, thereby in each case avoiding the tendency of the helically wound strands or fibres to flatten the cross-shape of the rib during manufacture of the wound article.

The invention claimed is:

1. A method of making an internal rib in a helically wound article including the steps of, in any suitable order, providing a generally inverted pyramidal-shaped elongated rib former for receiving, in use, bunched strands or tows of continuous fibre, each bunch being held taut in-line with the major axis of the intended rib within the rib former, and sequentially helically winding fibres around an article former and into the rib former, whereby the bunched strands are each separated by helically wound strands of fibre, to thereby form on completion a wound article having integrally formed internal support ribs of shape corresponding to the rib former.

* * * * *

UNITED STATES PATENT AND TRADEMARK OFFICE
CERTIFICATE OF CORRECTION

PATENT NO.         : 9,180,626 B2
APPLICATION NO.    : 14/315565
DATED              : November 10, 2015
INVENTOR(S)        : Anthony Carey Williams It is certified that error appears in the above-identified patent and that said Letters Patent is hereby corrected as shown below:

Specification
Column 2, line 60
"strands 5 are again held taught taut and"
should be: --strands are again held taut and--

Signed and Sealed this
Twenty-second Day of March, 2016

Michelle K. Lee
*Director of the United States Patent and Trademark Office*